United States Patent [19]

Barr et al.

[11] 4,017,976

[45] Apr. 19, 1977

[54] APPARATUS AND METHOD FOR MAXIMUM UTILIZATION OF ELONGATED STOCK

[76] Inventors: Anthony J. Barr, 2713 Vanderbilt Road, Raleigh, N.C. 27607; Alexander G. Mullin, 118 Hawthorne Road, Raleigh, N.C. 27605

[22] Filed: July 3, 1974

[21] Appl. No.: 485,736

[52] U.S. Cl. .............................. 33/1 S; 235/151.1; 235/151.3
[51] Int. Cl.² .......................................... G05B 13/00
[58] Field of Search ......... 33/1 S; 235/151.1, 151.3

[56] References Cited

UNITED STATES PATENTS

| | | | |
|---|---|---|---|
| 3,151,237 | 9/1964 | Hrabak | 235/151.13 |
| 3,490,147 | 1/1970 | Brichard et al. | 33/1 S |
| 3,633,009 | 1/1972 | Green | 235/151.13 |
| 3,870,872 | 3/1975 | Johnson | 235/151.13 |
| 3,876,872 | 4/1975 | Spitz | 235/151.1 |

*Primary Examiner*—William D. Martin, Jr.
*Attorney, Agent, or Firm*—Mason, Fenwick & Lawrence

[57] ABSTRACT

A method and apparatus for selecting the indicators on a backgauge of a crosscut saw to optimize the yield of usable lengths of stock such as boards of lumber having random unusable lengths containing knots, discoloration or the like from a grade mix of material being processed including the steps of determining the lengths of stock required, storing information describing the required lengths, calculating a value factor for each required length, and storing the value factor, storing statistical data describing usable lengths in various grades of stock, storing information on the proportions of the various grades being processed, determining and storing priority factors to increase the probability of cutting desired lengths, calculating the positions for the backgauge indicators, based on the stored information, which represent optimum possible combinations of lengths for each usable length which can be cut into the desired lengths, and listing the indicators at positions of full scale on a continuous sheet of paper.

8 Claims, 7 Drawing Figures

Fig-2  METHOD OF SELECTING INDICATORS FOR BACKGAUGE

INPUT
- STEP 1 – DETERMINE LENGTHS DESIRED
- 2 – STORE INFORMATION REPRESENTING LENGTHS DESIRED
- 3 – STORE STATISTICAL DATA ON YIELD OF USABLE LENGTHS IN VARIOUS GRADES OF STOCK

PROCESSING
- 4 – CALCULATE VALUE FACTORS FOR EACH LENGTH BASED ON STEP-3

INPUT
- 5 – STORE VALUE FACTORS
- 6 – DETERMINE PRIORITY FACTORS
- 7 – STORE PRIORITY FACTORS
- 8 – STORE GRADE MIX BEING PROCESSED

PROCESSING
- 9 – CALCULATE FINAL VALUE FACTOR
- 10 – CALCULATE ALL COMBINATIONS OF LENGTHS TO THE MAXIMUM CLEAR LENGTHS TO BE CUT
- 11 – COMPARE VALUE FACTORS FOR EACH COMBINATION WITH PRIOR VALUE FACTORS
- 12 – RETAIN ONLY COMBINATIONS WITH TOTAL VALUE FACTORS HIGHER THAN PRECEDING TOTAL VALUE FACTORS

OUTPUT
- 13 – LIST CALCULATED OPTIMUM BACKGAUGE INDICATORS

Fig-4
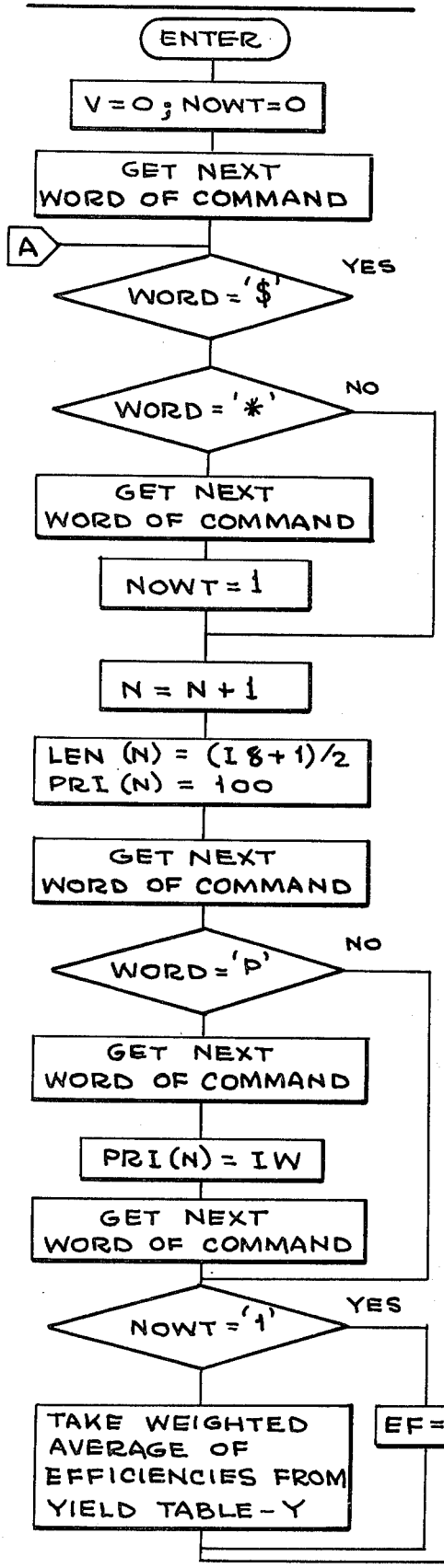
Fig-5
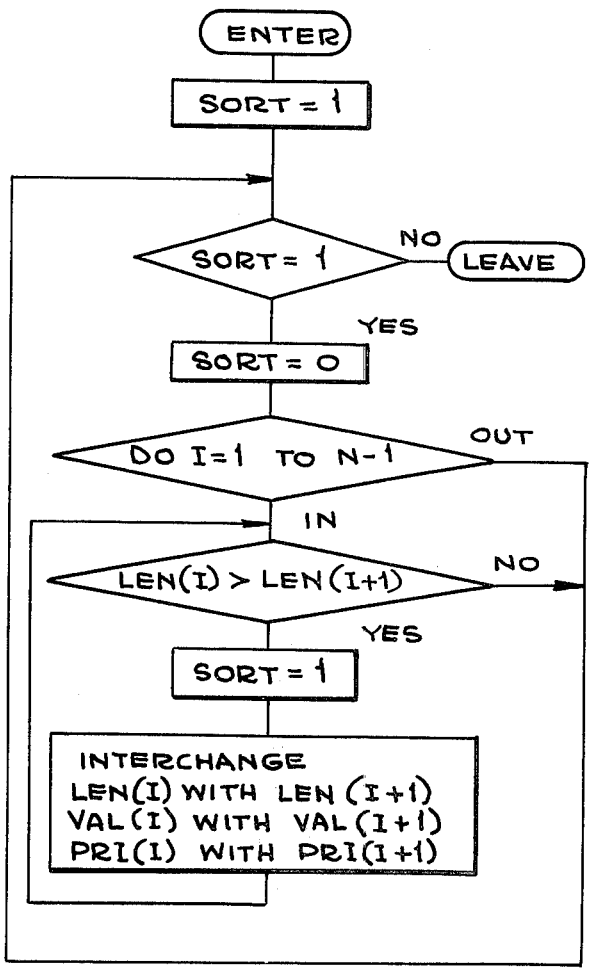
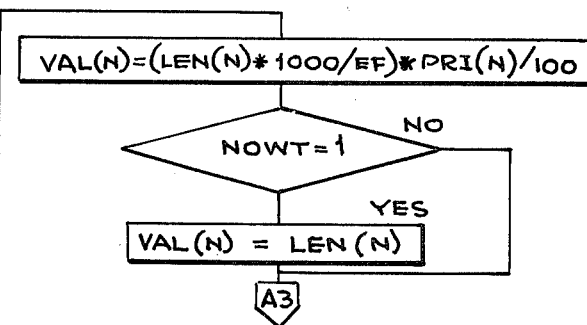

GENERATE VALUES OF LENGTHS

FLOWCHART OF CUT SUBROUTINE

APPARATUS AND METHOD FOR MAXIMUM UTILIZATION OF ELONGATED STOCK

The present invention relates in general to a method and apparatus for selecting indicators on a backgauge of a crosscut saw or the like to optimize the yield of usable lengths of stock such as a board of lumber having random unusable lengths containing knots, discoloration or the like from a grade mix (such as combinations of FAS, Select etc. in the case of lumber) of stock being processed. The present invention more specifically relates to such a method and apparatus for use with a mini-computer having a printout terminal.

In the prior art, particularly in lumber processing, backgauges have been utilized with crosscut saws to show the operator what lengths he should cut from the clear lengths between unusable defect containing lengths in a board of lumber. The backgauges normally comprise a perforated strip positioned behind and to the left of a crosscut saw and have indicators such as golf ball tees inserted in the perforations of the strip at distances from the saw blade which correspond to clear lengths which may be cut from the board. The indicators at each position shows the combination of desired lengths to be cut from each clear length extending from the saw to that position.

For example, as shown in FIG. 1, the indicators are positioned behind the stock being cut and indicate the desired lengths of 13 inches, 20 inches and 27 inches. The operator positions the stock in front of the crosscut saw to cut off the first unusable defect containing length and then looks at the left most indicator which is aligned with the clear portion of the stock extending from the cut to the next unusable defect in stock. In FIG. 1, the first indicator shows that a 13 inch length should be cut, the second indicator shows that a 20 inch piece should be cut, and so forth. The lengths to be cut can be indicated by inserting colored golf ball tees, which correspond to the length to be cut, in a perforated strip positioned behind and to the left of the crosscut saw as shown in FIG. 1. If green golf ball tees indicate 13 inch lengths then the third indicator to the left of the saw in FIG. 1 would have green golf ball tees which would tell the operator to cut two 13 inch lengths if his clear length does not extend to the next indicator.

In the prior art, many furniture companies, in particular, have tried to use backgauges on their crosscut saws to optimize the yield of required usable lengths of lumber from stock containing unusable lengths; however, most attempts to use a backgauge effectively have failed for several reasons. The primary reason for failure is the very large number of combinations possible when just a few required lengths are being cut.

Previously, the backgauge indicator positions have been selected on the basis of experience or have been limited in size to reduce the number of combinations of indicators for each clear length. While experience can provide reasonably effective combinations of backgauge indicators, experience will not generally provide a combination of indicators which result in yields of lengths satisfying a billing requirement which even approach optimum unless the experience is based on cutting large qualities of the same required lengths, (i.e., same billing requirement) from the same grade mix of material and testing many combinations of backgauge indicators. If the backgauge is limited in size, as it usually is, its usefulness for improving yield will be reduced. The backgauge should be as long as the longest clear length that will occur in any given board because the long clear lengths occur infrequently and it is important to take full advantage of these clear lengths to optimize yield. Prior to the present invention, roughmill operators have had to rely solely on their past experience in determining the proper combination of backgauge indicators for the various grade mixes of material being processed and for the particular billing requirements being satisfied.

The present invention permits optimizing the yield of lumber or other types of stock for various grade mixes and required lengths without any trial and error. With the present invention as used with a mini-computer and a printout terminal to provide a method for optimizing the yield of lumber stock, the crosscut saw operator need only input the grade mix of lumber being processed and the lengths desired into the computer and almost immediately the computer will print out the optimum combination of backgauge indicators.

Accordingly, it is the primary object of the present invention to provide a novel method and apparatus for selecting the indicators on a backgauge to optimize the yield of required usable lengths from pieces of stock containing random unusable lengths.

Another object of the present invention is to provide such a novel method and apparatus which utilize the data storage and high speed computational capability of mini-computers.

A still further object of the present invention is to provide a novel method and apparatus for selecting the indicators of a backgauge which result in a full scale printout on a continuous sheet of paper to show the exact location of each of the indicators when the paper is positioned behind a cutoff device.

Another object of the present invention is to provide a backgauge which utilizes a continuous sheet of paper having a full scale printout to show the exact location of each of the indicators thereby eliminating human error and labor involved in transferring the information on the listing to a conventional backgauge.

An additional object of the present invention is to provide a novel method and apparatus for decreasing the skill required of a cutoff device operator to process stock containing randomly located unusable lengths into desired lengths.

Another object of the present invention is to provide a novel method and apparatus for reducing the number of indicators on a backgauge thereby simplifing the backgauge and increasing the speed of the cutoff operation.

A further object of the present invention is to set the indicators on a backgauge based on the grade mix of stock being processed.

A still further object of the present invention is to provide a novel method and apparatus for selecting the indicators on a backgauge which are simple and efficient to use.

Other objects and advantages of the invention will become more apparent to those persons having ordinary skill in the art to which the present invention pertains from the following description taken in conjunction with the accompanying drawings wherein:

FIG. 2 is a block diagram of the sequential steps performed in practicing the preferred method of the present invention by employment of the system of FIG. 1;

FIG. 4 is a flow diagram of the Read Lengths of Pieces subroutine of the main flow diagram of FIG. 3;

FIG. 5 is a flow diagram of the Sort Lengths subroutine of the main flow diagram of FIG. 3;

Figure 1:
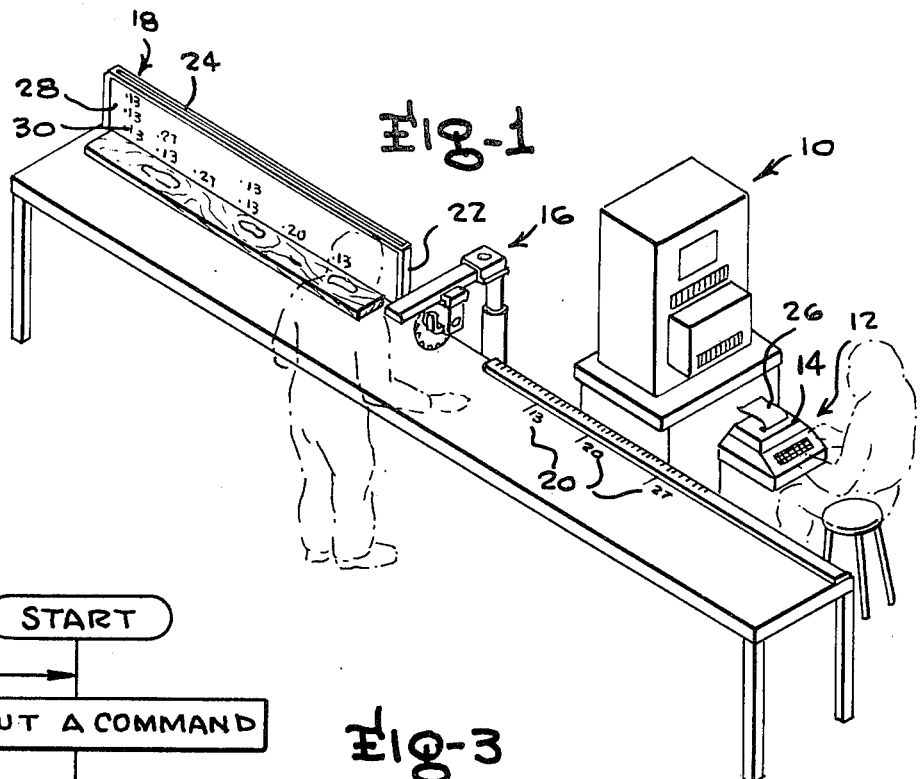
FIG. 1 is a perspective view of a system embodying the present invention.

Referring first to FIG. 1 of the drawings there is illustrated a preferred embodiment for practice of the present invention, which includes a mini-computer 10 such as the T1 980 or 960A computers manufactured by Texas Instruments, Incorporated of Houston Tex. The mini-computer 10 is used in combination with an input-/output terminal 12 having an output printer 14, a cutoff saw 16, a backgauge 18, and cutoff marks 20. The mini-computer provides sufficient information storage capacity and computational capability to efficiently utilize the method of the present invention; however, a large multi-purpose computer may also be used.

The preferred embodiment of the method of the present invention as applied to a computer includes the steps shown in the block diagram in FIG. 2 wherein Step 1 is the determination by the operator of the lengths of stock which are desired to be cut for the specific job and Step 2 is the storing of data representing the desired lengths in the computer storage.

Step 3 is storing statistical data representing the yield of usuable lengths in the various grades of stock included in the grade mix being processed. For example, if hardwood lumber is being processed, it is sold by quality grades which are defined by the National Hardwood Lumber Association and include the grades of FAS (first and second), Select, 1 Common and 2 Common. There are significant differences between grades relative to the cost of the lumber and relative to the number of different usable lengths which can be obtained from each grade. Where lumber is being processed, the statistical data would include the probable number of board feet of each particular length of lumber available from a unit of lumber being processed. For example, the statistical data may show that 250 board feet of 36 inch long usable boards can be cut per 1,000 board feet for Select grade lumber. The statistical data may be permanently retained in the computer storage and therefore would not have to be inputted each time a listing of indicators is required.

The calculation in Step 4 of a value factor for each length desired is based on the data stored in Step 3. The value factor is established per board foot for each grade and is increased for the longer lengths which have a lower probability of being produced for each unit of lumber processed. The desired lengths which are longer will have higher value factors per board foot, which increases the probability of the computer selecting an indicator which includes the longer lengths. For example, the computer might when processing grade 1 Common lumber determine that it is better to cut up a 71 inch clear length by cutting out a 61 inch piece rather than one 42 inch, one 15 inch, and one 13½ inch piece. Approximately 10 inches of clear length will be thrown away, but the final result will be one long piece instead of three shorter pieces. The computer through the value factors, has recognized that long pieces are rare in such low grade lumber and consequently provides for the cutting of such at the opportune moment. While it is easy to maximize yield in the beginning of a cutting bill by cutting the shorter lengths, the quantity of short lengths required is usually obtained early in the cutting and the yield thus falls drastically since only long pieces will be needed. Value factors increase the probability of cutting the longer pieces from available clear lengths. After being calculated, the value factors are transferred to computer storage as shown in Step 5.

In Step 6, the operator may increase a value factor for any length by selecting a priority factor which is multiplied times or added to the value factor for any desired length. The priority factor permits the operator to increase the probability of cutting a desired length if pieces of that length are needed quickly. After deciding on the appropriate priority factors, the operator, as shown in Step 7, stores the priority factors in the computer storage.

The operator information as shown in Step 8 to describe the grade mix of lumber being processed such as, for example, 10% grade FAS, 10% grade Select, 40% grade 1 Common and 40% grade 2 Common. The grade mix which is being processed will probably have been selected to minimize the cost of producing the required number of desired lengths.

The final value factor for each desired length is calculated in Step 9 by adding the relative proportion of each value factor for the desired length in each of the grades in the grade mix being processed. For example, if the value factors for the various grades are 1.05 for grades FAS, 1.1 for grade Select, 1.3 for grade 1 Common and 1.5 for grade 2 Common and the grade mix is 10% FAS, 10% Select, 40% 1 Common, and 40% 2 Common then the relative proportion of each value factor is 0.105 for FAS, 0.11 for Select, 0.52 for 1 Common and 0.60 for 2 Common which add up to a final value factor of 1.335.

Step 10 is achieved by calculating all of the possible combinations of desired lengths which can be cut from the maximum clear length occurring in the lumber being processed. The following table specifies all of the possible combinations of desired lengths (in inches) 13, 20, 27, 34, 47 and 56, for a maximum clear length of 93 inches where the combination of indicators for each usable length is indicated by the combination of colors representing the desired lengths as indicated:

| DESIRED LENGTH | INDICATOR COLOR |
| --- | --- |
| 13 | WHITE |
| 20 | GREEN |
| 27 | BLUE |
| 34 | YELLOW |
| 47 | RED |
| 56 | ORANGE |
| USABLE LENGTH | INDICATORS |
| 13 | WHITE |
| 20 | GREEN |
| 26 | WHITE WHITE |
| 27 | BLUE |
| 33 | GREEN WHITE |
| 34 | YELLOW |
| 39 | WHITE WHITE WHITE |
| 40 | BLUE WHITE |
| 46 | GREEN WHITE WHITE |
| 47 | RED |
| 52 | WHITE WHITE WHITE WHITE |
| 53 | BLUE WHITE WHITE |
| 54 | YELLOW GREEN |
| 56 | ORANGE |

-continued

| | |
|---|---|
| 59 | GREEN WHITE WHITE WHITE |
| 60 | RED WHITE |
| 61 | YELLOW BLUE |
| 66 | WHITE WHITE WHITE WHITE WHITE |
| 66 | BLUE WHITE WHITE WHITE |
| 67 | RED GREEN |
| 68 | YELLOW YELLOW |
| 69 | ORANGE WHITE |
| 73 | GREEN WHITE WHITE WHITE WHITE |
| 73 | RED WHITE WHITE |
| 74 | RED BLUE |
| 76 | ORANGE GREEN |
| 79 | WHITE WHITE WHITE WHITE WHITE WHITE |
| 80 | BLUE WHITE WHITE WHITE WHITE |
| 80 | RED GREEN WHITE |
| 81 | RED YELLOW |
| 82 | ORANGE WHITE WHITE |
| 83 | ORANGE BLUE |
| 86 | GREEN WHITE WHITE WHITE WHITE WHITE |
| 86 | RED WHITE WHITE WHITE |
| 87 | RED BLUE WHITE |
| 88 | YELLOW YELLOW GREEN |
| 89 | ORANGE GREEN WHITE |
| 90 | ORANGE YELLOW |
| 92 | WHITE WHITE WHITE WHITE WHITE WHITE WHITE |
| 93 | BLUE WHITE WHITE WHITE WHITE |
| 67 | RED GREEN |
| 69 | ORANGE WHITE |
| 76 | ORANGE GREEN |
| 81 | RED YELLOW |
| 82 | ORANGE WHITE WHITE |
| 83 | ORANGE BLUE |
| 89 | ORANGE GREEN WHITE |
| 90 | ORANGE YELLOW |

To determine the value of each possible combination of the desired lengths, the final value factors which are per unit length are multiplied times the lengths in each combination and the values for all lengths for that combination are added together to get a total value. Step 11 is achieved by comparing total value factors beginning with the shortest length and in Step 12 retaining only those combinations which have higher total values than any preceding combination.

The final step, 13, is to list the retained combinations which represent the optimum backgauge indicators derived from the list shown above under Step 10 and from the analysis in Steps 11 and 12. The following table exemplifies Step 13 and shows the desired lengths and associated indicator colors, the priority factors, the value factor of each desired length and the list of backgauge indicators which will optimize the yield of desired lengths from the quality mix listed:

| GRADE QUALITY MIX (in Percent) | FAS 10% | Select 10% | 1 Common 40% | 2 Common 40% |
|---|---|---|---|---|
| DESIRED LENGTH (in inches) | INDICATOR COLOR | PRIORITY FACTOR | VALUE FACTOR | |
| 13 | WHITE | 100 | 21 | |
| 20 | GREEN | 100 | 35 | |
| 27 | BLUE | 100 | 50 | |
| 34 | YELLOW | 100 | 68 | |
| 47 | RED | 100 | 104 | |
| 56 | ORANGE | 100 | 137 | |

| USABLE LENGTH | INDICATORS |
|---|---|
| 13 | WHITE |
| 20 | GREEN |
| 26 | WHITE WHITE |
| 27 | BLUE |
| 33 | GREEN WHITE |
| 34 | YELLOW |
| 40 | BLUE WHITE |
| 46 | GREEN WHITE WHITE |
| 47 | RED |
| 56 | ORANGE |

By increasing the priority factor for the desired length of 27 inches to 130 the preceding table is changed as shown below:

| DESIRED LENGTH (in inches)/ COLOR | INDICATOR FACTOR | PRIORITY FACTOR | VALUE |
|---|---|---|---|
| 13 | WHITE | 100 | 21 |
| 20 | GREEN | 100 | 35 |
| 27 | BLUE | 130 | 65 |
| 34 | YELLOW | 100 | 68 |
| 47 | RED | 100 | 104 |
| 56 | ORANGE | 100 | 137 |

| USABLE LENGTH | INDICATORS |
|---|---|
| 13 | WHITE |
| 20 | GREEN |
| 26 | WHITE WHITE |
| 27 | BLUE |
| 34 | YELLOW |
| 40 | BLUE WHITE |
| 47 | RED |
| 53 | BLUE WHITE WHITE |
| 54 | BLUE BLUE |
| 56 | ORANGE |
| 67 | RED GREEN |
| 67 | BLUE BLUE WHITE |
| 69 | ORANGE WHITE |
| 74 | RED BLUE |
| 76 | ORANGE GREEN |
| 80 | BLUE BLUE WHITE WHITE |
| 81 | BLUE BLUE BLUE |
| 83 | ORANGE BLUE |
| 90 | ORANGE YELLOW |

The list of backgauge indicators may be a printout list from the output printer 14 on which the list of optimum indicators are spaced according to the actual scale of the lengths being cut and the printout list may then be placed in the backgauge 18 as shown in FIG. 1 to provide a full scale backgauge. The backgauge 18 has a frame 22 which is of thin box-like construction having an open top creating a slot 24 through which the printout 26 from the printer 14 can be inserted. The front of the frame 22 has a window 28 which may be covered with a sheet of plastic to expose the printout list as shown in FIG. 1. In lieu of the printout sheet, optical display devices 30 capable of displaying the desired lengths may be utilized.

As will be obvious to one skilled in the art, the value factors may be based on the economic value of the desired lengths rather than on the yield as described above.

A duplication of a computer printout listing the instructions of a specific computer program written in IBM computer language of PL1 is listed below which substantially conforms to the flow diagrams illustrated in FIGS. 3 through 7.

PROGRAM WRITTEN IN PL1

```
MAIN:    PROC OPTIONS(MAIN);
         DCL (MIX(4),EFC(4),I100,I1000,I8)FIXED BIN(31);
         DCL WORD CHAR(20);
         DCL EFL RETURNS(FIXED BIN)
             ENTRY(FIXED BIN,FIXED BIN,FIXED BIN,FIXED BIN);
         DCL CARD CHAR(80);
         DCL (C1 CHAR(1),C2 CHAR(2),C3 CHAR(3),C4 CHAR(4))DEF CARD;
         DCL X FLOAT(12);
         ON ENDFILE(SYSIN)GO TO END;
         ON CONVERSION GO TO NUMERR;

LOOP:    READ FILE(SYSIN)INTO(CARD);
         IP=2;
         IF C1='B' THEN DO;CALL BACK;GO TO LOOP;END;
         IP=4;
         IF C3='MIX' THEN DO;
             DO I=1 TO 4;CALL GET;MIX(I)=I1000;END;
             GO TO LOOP;END;
         IF C3='EFC' THEN DO;
             DO I=1 TO 4;CALL GET;EFC(I)=I1000;END;
             GO TO LOOP;END;
         CALL ERR('NOT RECOGNIZED');
NUMERR:  CALL ERR('NUMBER FORMAT');

BACK:    PROC;      /* BACK GAUGE PROCEDURE */
         DCL CUT RETURNS(FIXED BIN);
         DCL EF FIXED BIN;
         DCL 1 STR(20),2(LEN,VAL,PRI)FIXED BIN;
         DCL LL(20)FIXED BIN,N;
         DCL COLOR(20)CHAR(7)STATIC VARYING INIT(
             'WHITE','GREEN','BLUE','YELLOW','RED', 'ORANGE','BLACK',
             'PINK','PURPLE','BROWN',
                 'C11','C12','C13','C14','C15','C16','C17',
             'C18','C19','C20');
         DCL V(0:480)FIXED BIN(31);
         DCL SORT BIT(1);
         DCL NOWT BIT(1)INIT('0'B);
         DCL (IL,IK)FIXED BIN(31);
         N=0;V=0;

/* READ THE BACK GUAGE CARD */

CALL GET;N=0;

DO WHILE(WORD¬='$');
         IF WORD='*' THEN DO;CALL GET;NOWT='1'B;END;
         N=N+1;LEN(N)=(I8+1)/2;PRI(N)=100;
         CALL GET;
         IF WORD='P' THEN DO;CALL GET;PRI(N)=IW;CALL GET;END;
         IF NOWT THEN EF=1000;ELSE
         EF=EFL(LEN(N)*2,8,1,1000); /* EFFICIENCY FACTOR FOR MIX 1   */
         IL=LEN(N)*1000;IK=IL/EF;
         VAL(N)=IK*PRI(N)/100;
         IF NOWT THEN VAL(N)=LEN(N);
         END;

/* SORT BY LENGTHS */
```

```
           SORT='1'B;
           DO WHILE(SORT);SORT='0'B;
           DO I=1 TO N-1;
        IF LEN(I)>LEN(I+1) THEN DO;SORT='1'B;
              STR(20)=STR(I);STR(I)=STR(I+1);STR(I+1)=STR(20);END;
           END;
           END;

/* PRINT THE COLORS */

IF N<2 THEN CALL ERR('LESS THAN 2 LENGTHS');
           PUT EDIT('LENGTH COLOR   PRIORITY')(SKIP(3),A);PUT SKIP;
           DO I=1 TO N;
           PUT EDIT(' ')(A)SKIP;CALL PUT(LEN(I)*2);
           PUT EDIT(COLOR(I))(X(1),A(7));
           PUT EDIT(PRI(I))(F(7));
           END;

PUT SKIP;

PUT EDIT('BACK GAUGE','LENGTH COLORS')(SKIP(1),A,SKIP(2),A);
           PUT SKIP;

/* GENERATE VALUES OF LENGTHS */

DO I=0 TO 480;J=CUT(I);END;
           IL=0;
           DO I=1 TO 480;
           IF V(I)>IL THEN
              DO;IL=V(I);
              PUT EDIT(' ')(A)SKIP;CALL PUT(I*2);
              J=I;
              DO WHILE(J>0);
              JC=CUT(J);
              DO K=1 TO N;
              IF LEN(K)=JC THEN PUT EDIT(COLOR(K))(X(1),A);
              END;
              J=J-JC-1;
           END;
           END;END;

CUT:       PROC(M)RETURNS(FIXED BIN);DCL (IC,I,L,VC)FIXED BIN;
           V(M)=0;IC=M;
           DO I=1 TO N;L=LEN(I);
           IF L=M THEN IF VAL(I)>V(M) THEN DO;V(M)=VAL(I);IC=L;END;
           IF L<M THEN DO;VC=V(L)+V(M-L-1);
                       IF VC>=V(M) THEN DO;V(M)=VC;IC=L;END;
                       END;
           END;
           RETURN(IC);

END CUT;

END BACK;
           DCL PUT ENTRY(FIXED BIN);

PUT:       PROC(X);DCL X FIXED BIN;
           DCL I,J;I=X/8;J=X-I*8;
           PUT EDIT(I,':',J)(F(3),A,F(1));

END PUT;
```

```
GET:     PROC;                    /* ADVANCE TO NEXT WORD */
         DCL XP FIXED(15,5);
         DCL C(80) CHAR(1)DEF CARD,I,J;
         DCL W(20)CHAR(1)DEF WORD;

LOOP:    IF C(IP)=' ' THEN IF IP=80 THEN DO;WORD='$';GO TO NULL;END;
                              ELSE DO;IP=IP+1;GO TO LOOP;END;
         I,J=IP;
LZ:      IF IP=80 THEN DO;J=IP;GO TO SETWORD;END;
         IP=IP+1;
         IF C(IP)¬='R' THEN
         IF C(IP)¬='B' THEN
         IF C(IP)¬=' ' THEN GO TO LZ;
         J=IP-1;

SETWORD: WORD=SUBSTR(CARD,I,J-I+1);

NULL:    I=INDEX(WORD,':');J=0;
         IF I¬=0 THEN DO;J=W(I+1);W(I),W(I+1)=' ';END;
         XP=0;
         IF W(1)>='0'|W(1)='.' THEN XP=WORD;
         X=XP;IW=XP;I100=XP*100;I1000=XP*1000;I8=XP*8+J;

END GET;

ERR:     PROC(A);DCL A CHAR(*);
         PUT EDIT(CARD,'*** '||A)(SKIP,A);GO TO LOOP;
         END;

EFL:     PROC(L,MW,MX,ADJF)RETURNS(FIXED BIN);
         DCL I1,I2,M,N,I,J;
         DCL(WI,ADJF)FIXED BIN;
         DCL EFG(4)FIXED BIN,E FIXED BIN(31);
         M=L/96;N=M+1;
         IF N>9 THEN N=9;
         I1=L-M*96;I2=96-I1;
         WI=(MW+7)/8;
         I=1;
         DO I=1 TO 4;EFG(I)=(Y(I,M,WI)*I2+Y(I,N,WI)*I1)/96*ADJF/10000;
         END;
         E=0;
         DO J=1 TO 4;E=E+EFG(J)*MIX(J)/1000*EFC(MX);END;
         RETURN(E/1000);

END EFL;
``` wherein the key variables are:

| | |
|---|---|
| V(0:480) | Value of Board at ¼" increments. |
| LEN (20) | Length of Piece. |
| PRI (20) | Priority of Piece. |
| VAL (20) | Value of Piece. |
| Y (4,9,12) | Lumber Yield Tables; Board Fee Produced per 1000BFT |
| N | Number of pieces in command. |
| MIX (4) | Fraction of Lumber in "a" grade. |
| EFC (4) | Efficiency of Cutting for grade. |

Following is a sample of data for use with the above computer program:

| EFC | .9 | .9 | .9 | .9 | | |
|---|---|---|---|---|---|---|
| MIX | .1 | .1 | .4 | .4 | | |
| B | 13 | 20 | 27 | 34 | 47 | 56 |

Figure 3:
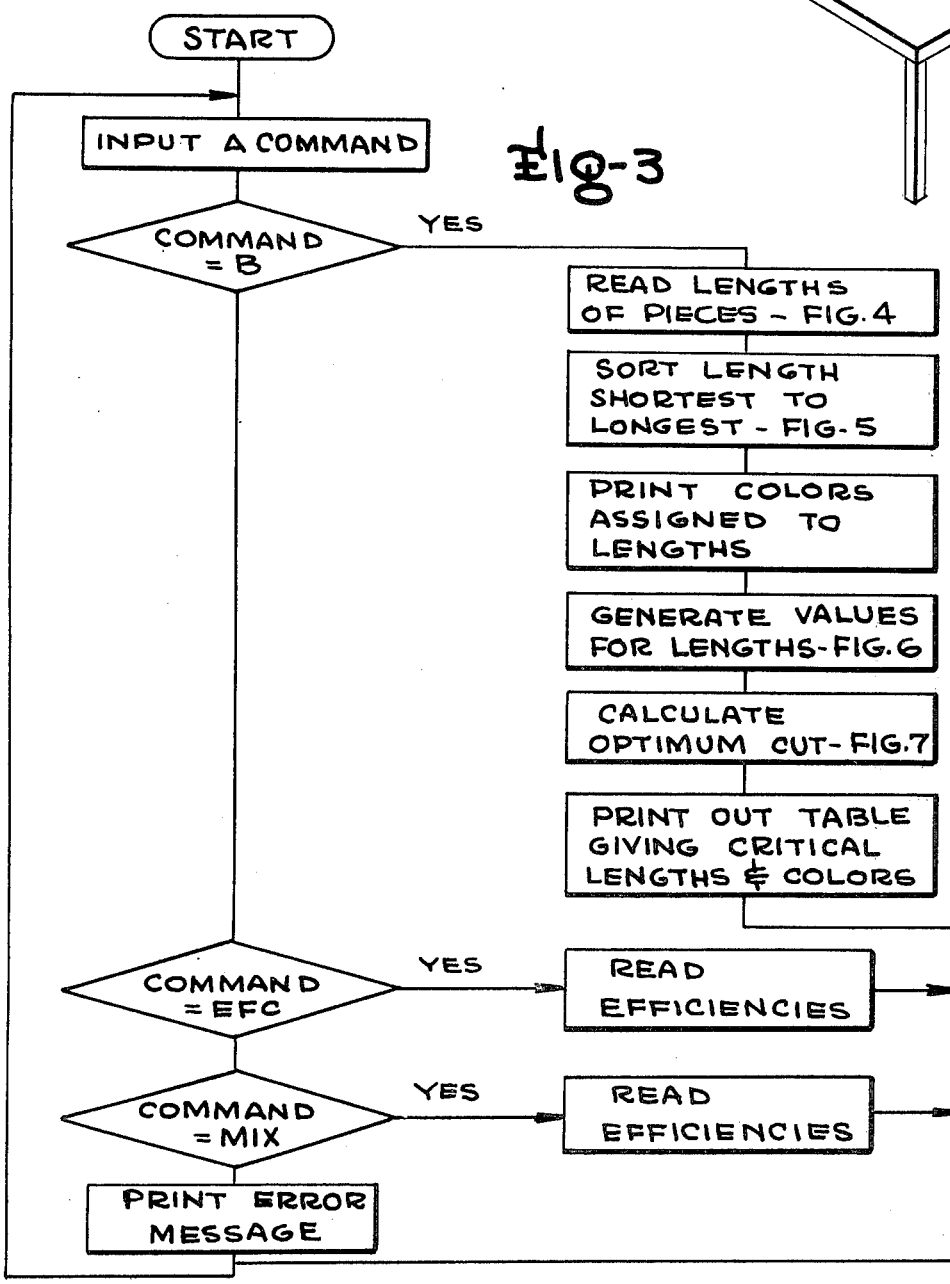
FIG. 3 is the main flow diagram of a computer program for practicing the preferred method of the present invention.
Figure 6:
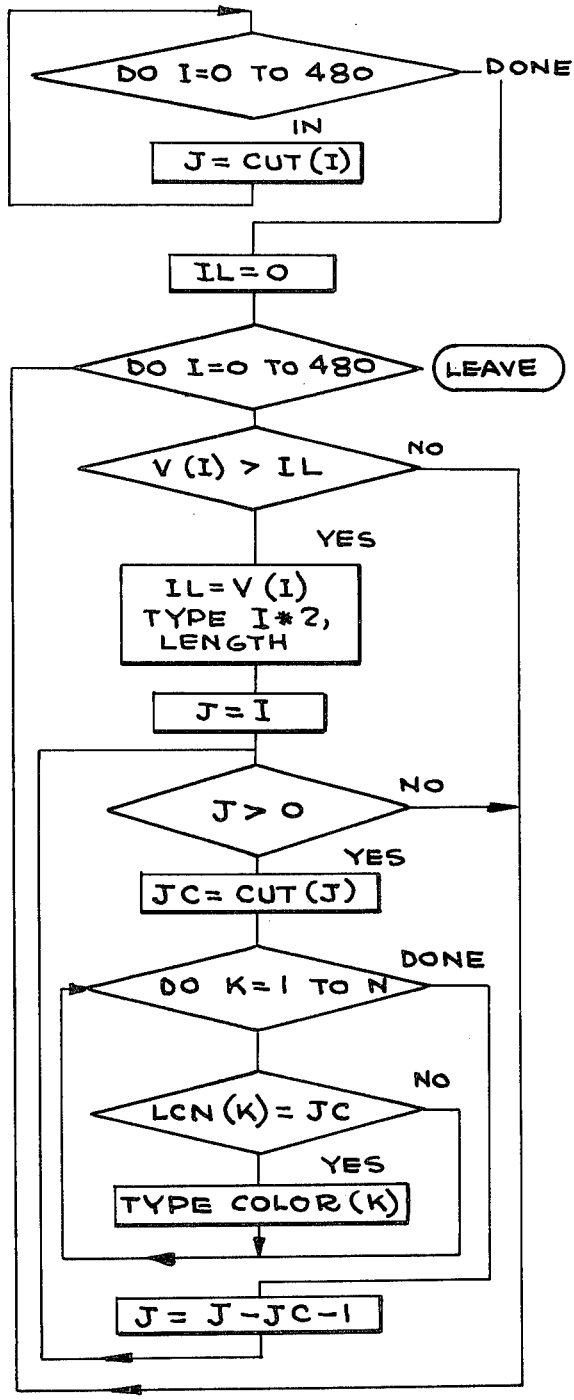
FIG. 6 is a flow diagram of the Generate Values of Lengths subroutine of the main flow diagram of FIG. 3.
Figure 7:
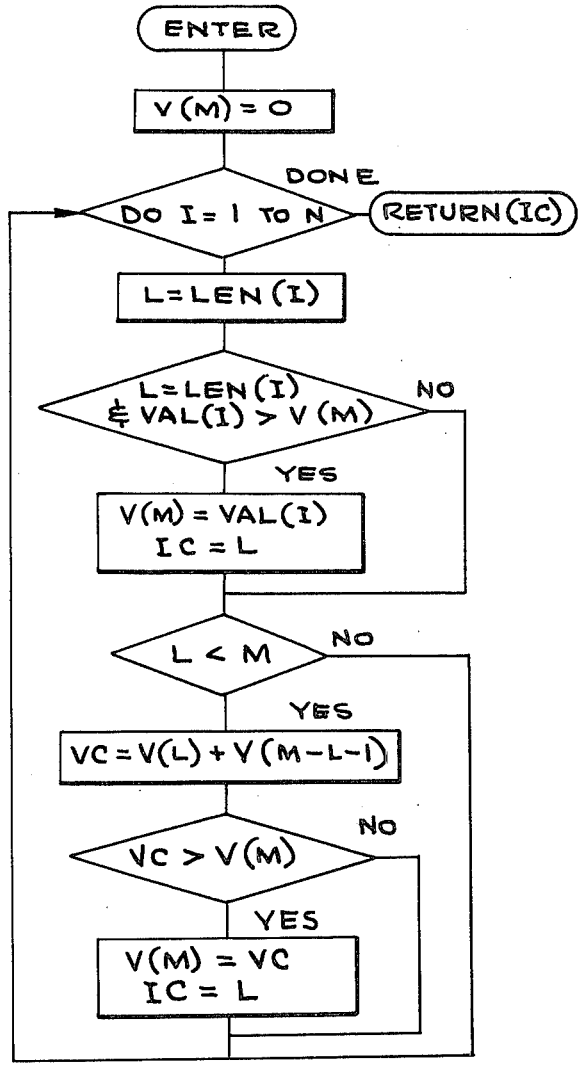
FIG. 7 is a flow diagram of the Cut Subroutine of the main flow diagram of FIG. 3.

FIG. 3 provides the main flow diagram and shows the major subroutines on the right side of the flow diagram for the above listed computer program. The flow diagrams of the subroutines shown in FIG. 4 through 7 and identified in the appropriate blocks in the main flow diagram of FIG. 3, provide the significant parts of the computer program. The flow diagram of the Cut Subroutine shown in FIG. 7 provides the calculation of the optimal cut, IC, for a given board, M long, which results in the highest value of the pieces produced. The table V contains the value of all lengths of boards and the CUT subroutine calculates the optimal cut by cutting all lengths in the billing requirement from one end of the board wherein the length which produced the highest value of the two resulting pieces is the optimal cut. In order to calculate the optimal cut of a board of length M the value, V(M), of the piece is calculated.

The subroutine GET, in the computer program listed above causes an advance to the next word of a command and defines the following variables:

| | |
|---|---|
| WORD: | The characters of the next word of a command. |
| IW | The integer value of a number. |
| I1000 | The value of a number times 1000. |

| | |
|---|---|
| 18 | The value of a number times 8. A length of 37 ¾" can be input as 37:3 and in such a case 18 will be set to 299. |

At the end of a command this subroutine will set the WORD variable to a dollar sign ($).

The subroutine EFL in the computer program listed above determines the efficiency by which the various lengths of boards will be cut wherein the efficiency is a function of the length of boards being cut and the grade mix of lumber being used. The table Y provides the number of board feet of a given length and width for each grade of lumber being cut which can be cut per thousand board feet of lumber being processed. The table Y has three dimensions, grade, length and width and the subroutines interpolated between the values.

From the foregoing detailed description, it will be evident that there are a number of changes, adaptations and modifications of the present invention which come within the province of those skilled in the art. However, it is intended that all such variations not departing from the spirit of the invention be considered as within the scope thereof and as limited solely by the appended claims.

We claim:

1. A method of selecting the indicators for a backgauge on a cross cut saw or the like to optimize the yield of required usable lengths of stock from a grade mix of stock being processed such as boards of lumber having randomly located unusable lengths containing knots, discoloration or the like, said method comprising: establishing the required lengths and the quantities of pieces of each length to be cut, determining a value factor for each desired length, establishing the probability of having a given length of usable stock in each of the grades of stock, establishing the grade mix of the various grades of stock being processed, determining from said required lengths, required quantities, value factors, probabilities and grade mix, the optimum possible combination of desired lengths for each usable length to be cut into the desired lengths, and visually displaying the optimum combinations of lengths thereby providing the indicators for the backgauge.

2. The method of claim 1 wherein the providing of the optimum combination of indicators comprises printing the optimum combination of desired lengths for each usable length of stock being processed at positions of actual length on a strip of paper thereby providing a full scale backgauge which can be placed behind the cross cut saw or the like to guide an operator in deciding what lengths to cut from each usable length of stock being processed.

3. The method of claim 1 including the additional step of determining and storing a priority factor for each desired length whereby the frequency of selecting an indicator for a desired length may be increased.

4. An apparatus for optimizing the yield of required usable lengths of stock from a grade mix of stock being processed such as boards of lumber having randomly located unusable lengths containing knots, discolorations or the like, said apparatus comprising means for determining and storing data describing the desired lengths and quantities of stock, means for storing statistical data describing the probability of having a given length of usable stock in each of the various grades of stock, means for storing information describing the grade mix of various grades of stock being processed, a first programmed means for calculating and storing value factors associated with each desired length, a second programmed means responsive to said desired lengths of stock, said desired quantities of stock, said statistical data on the various grades of stock, said information on the grade mix of various grades of stock being processed and said value factors for selecting the backgauge indicators which represent optimum possible combinations of lengths for each usable length of stock which can be cut into desired lengths, and means for visually displaying the optimum combination of lengths thereby providing the indicators for the backguage.

5. The apparatus of claim 4 wherein the means for visual display includes a printout means for spacing the indicators at positions of actual scale of the desired lengths being cut whereby the listing may be positioned behind a cut off device to create a full scale backgauge showing the optimum combinations of indicators for each usable length of stock being processed.

6. A backgauge having indicators for use with a cut off device such as a cross cut saw which optimize the yield of required usable lengths of stock such as a board of lumber having random unusable lengths containing knots, discoloration or the like from a grade mix of various grades of stock being processed comprising a print out list of the optimum indicators spaced according to the actual scale of the lengths being cut and a support member for the print out list positioned parallel to the stock to be cut thereby providing the cut off operator with a visual guide showing the desired lengths to cut from each clear length of stock being processed.

7. The method of claim 2 including the additional step of determining and storing a priority factor for each desired length whereby the frequency of selecting an indicator for a desired length may be increased.

8. The apparatus of claim 4 wherein the means for providing a visual display of the optimum combinations of indicators includes optical display devices operatively connected to the second programmed means and positioned behind a cut off device whereby the optical display devices create a full scale backgauge showing the optimum combinations of indicators for each usable length of stock being processed.

* * * * *